United States Patent
Poulsen

(10) Patent No.: US 9,273,943 B1
(45) Date of Patent: Mar. 1, 2016

(54) MULTIFUNCTION AERODYNAMIC HOUSING FOR BALLISTIC LAUNCH OF A PAYLOAD

(71) Applicant: Peter D. Poulsen, Grants Pass, OR (US)

(72) Inventor: Peter D. Poulsen, Grants Pass, OR (US)

( * ) Notice: Subject to any disclaimer, the term of this patent is extended or adjusted under 35 U.S.C. 154(b) by 0 days.

(21) Appl. No.: 14/190,607

(22) Filed: Feb. 26, 2014

Related U.S. Application Data

(60) Provisional application No. 61/769,699, filed on Feb. 26, 2013.

(51) Int. Cl.
| | |
|---|---|
| *F42B 10/00* | (2006.01) |
| *B64G 1/00* | (2006.01) |
| *F42B 14/00* | (2006.01) |
| *B64G 1/10* | (2006.01) |
| *F42B 15/00* | (2006.01) |

(52) U.S. Cl.
CPC ............. *F42B 10/00* (2013.01); *B64G 1/002* (2013.01); *B64G 1/10* (2013.01); *F42B 14/00* (2013.01); *F42B 15/00* (2013.01)

(58) Field of Classification Search
CPC .......... F42B 10/46; F42B 10/00; F42B 12/36; F42B 12/745; F42B 14/065; B64G 1/641; B64G 2005/005; B64G 1/645; B64G 1/002; F41A 1/02
USPC .................................................. 89/8, 5, 1.809
See application file for complete search history.

(56) References Cited

U.S. PATENT DOCUMENTS

| | | | |
|---|---|---|---|
| 7,775,148 B1 * | 8/2010 | McDermott | F41A 1/02 124/60 |
| 2012/0175457 A1 * | 7/2012 | Hunter | F41A 1/02 244/3.22 |

OTHER PUBLICATIONS

Gilreath et al; Tthe Feasibility of Launching Small Satellites with a Light Gas Gun; 12th AIAA/USU Conference on Small Satellites, Paper No. SSC98-III-6; 1998.
Stivers et al; Studies of optimum body shapes at hypersonic speeds; NASA Technical Note D-4191; 1967.

* cited by examiner

*Primary Examiner* — Joshua Freeman
*Assistant Examiner* — Bridget Cochran
(74) *Attorney, Agent, or Firm* — David S. Alavi

(57) ABSTRACT

A projectile comprises a payload and an aerodynamic outer housing. The outer housing is arranged, in launch and flight configurations, to surround the payload. The outer housing is further arranged, in the launch configuration, to be launched from a barrel of a launching gun or cannon. The outer housing is further arranged, in the flight configuration, to have a bi-tapered shape that is elongated along a fore-and-aft direction and has a longitudinal profile that tapers in both fore and aft directions. The outer housing is arranged to assume an exoatmospheric configuration upon reaching a target distance-from-launch, a target time-from-launch, a target altitude, or a target velocity. In the exoatmospheric configuration, either (i) the outer housing is arranged to release the payload or (ii) the outer housing and payload are arranged in a propulsion configuration. The projectile can include various additional components or adaptations to enable or achieve specific launch objectives.

7 Claims, 7 Drawing Sheets

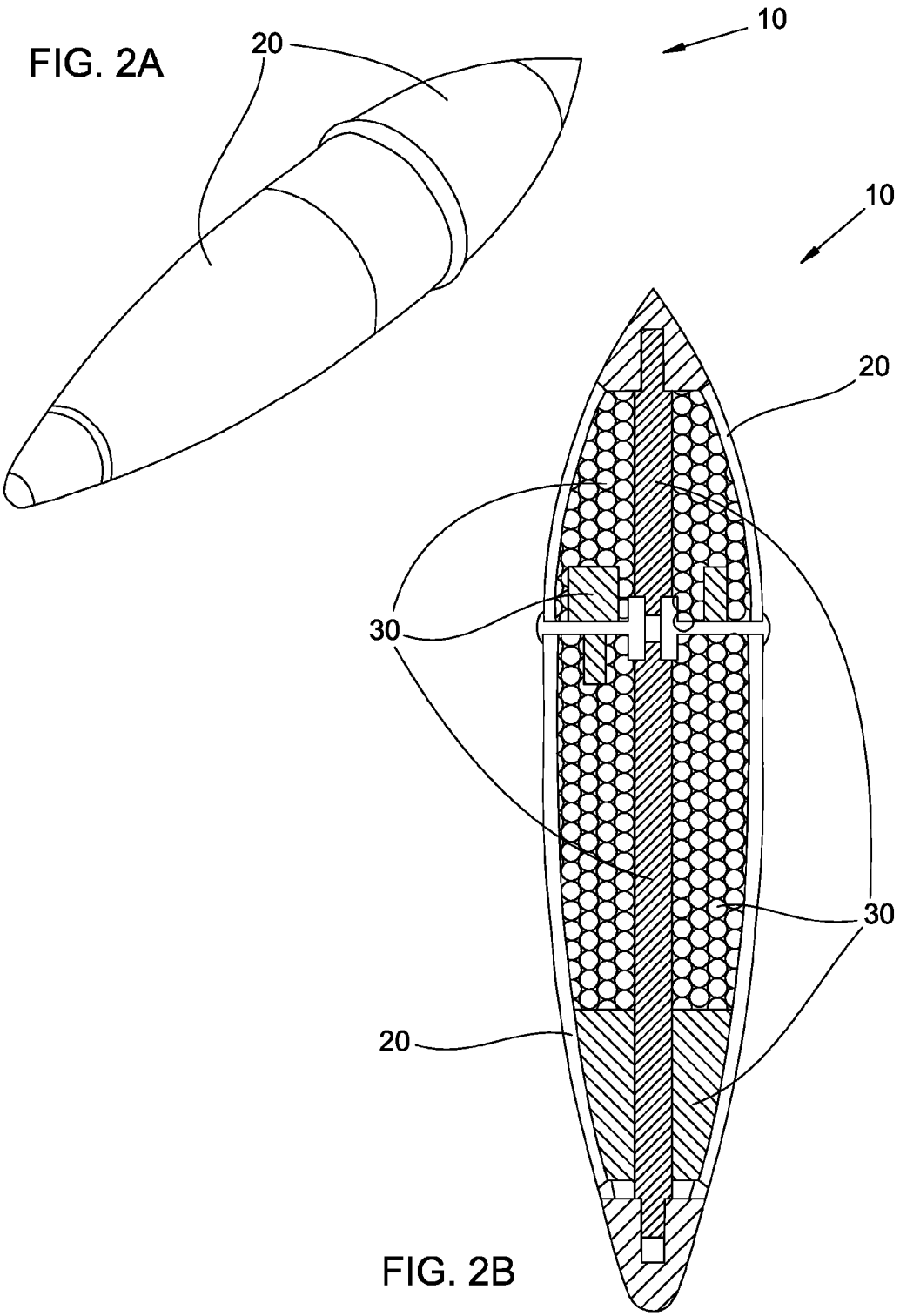

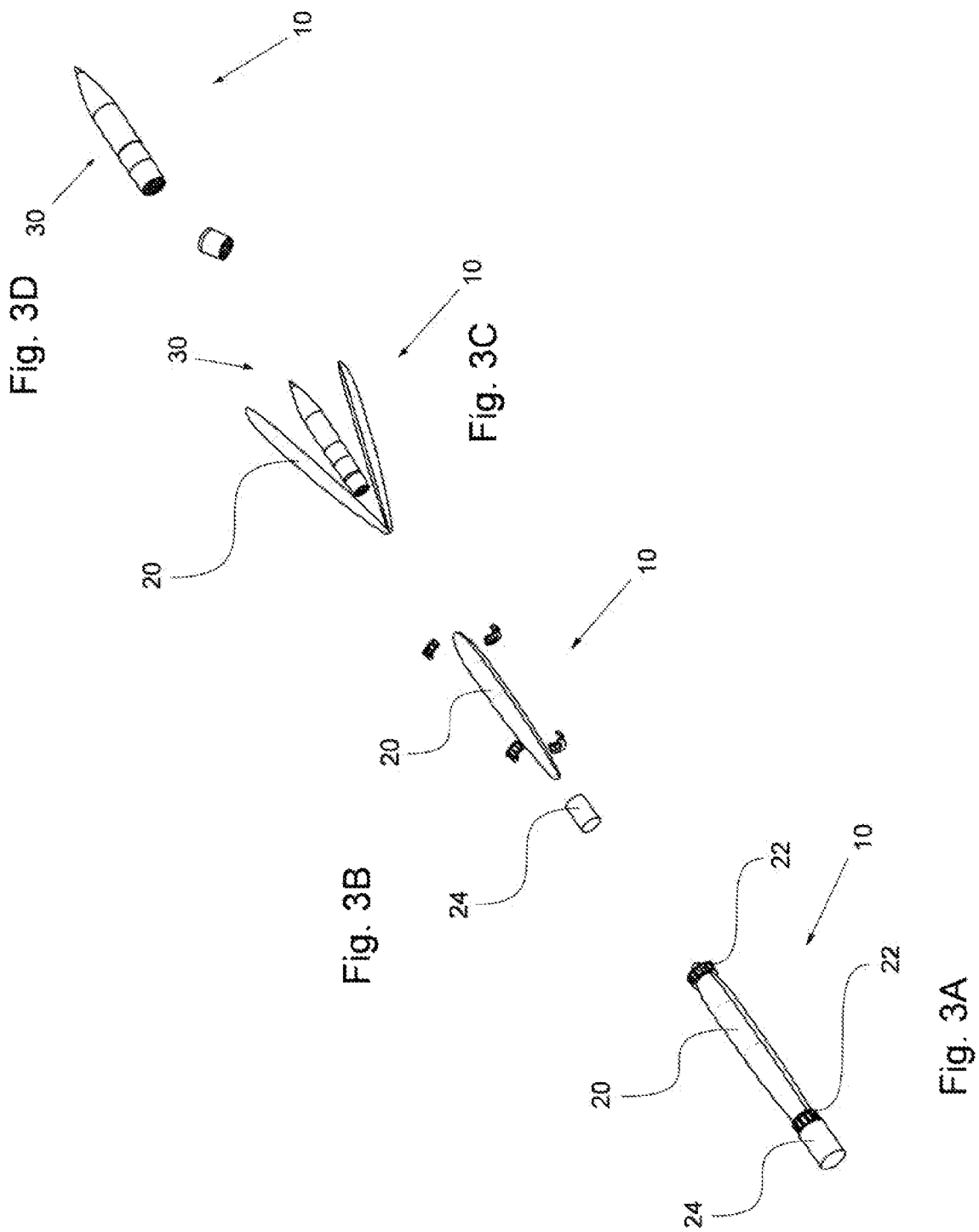

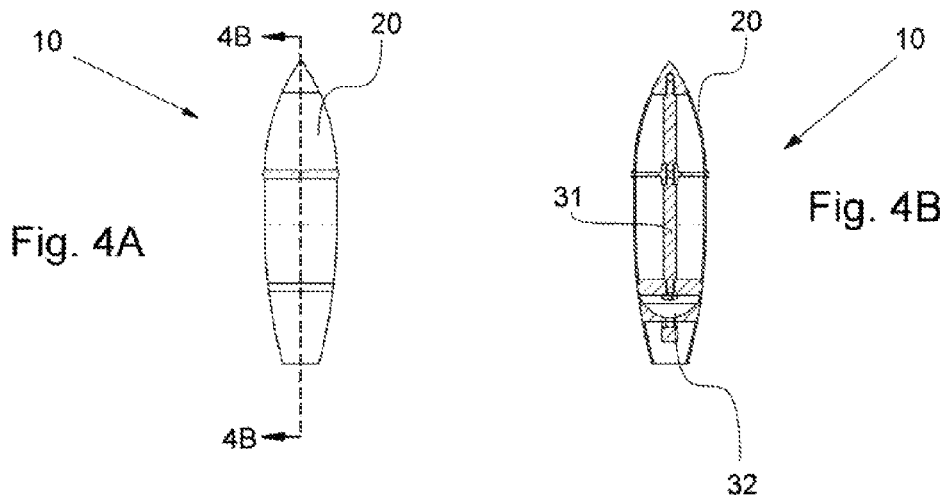
Fig. 4A
Fig. 4B
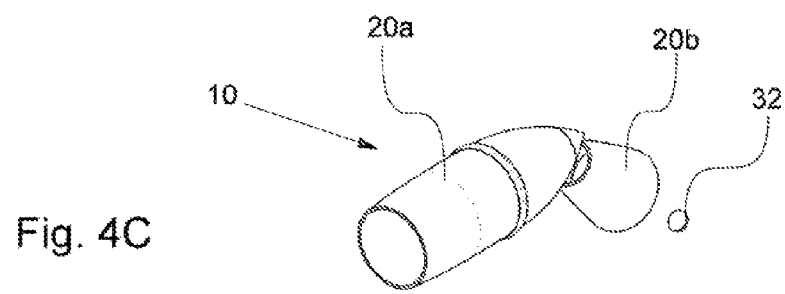
Fig. 4C
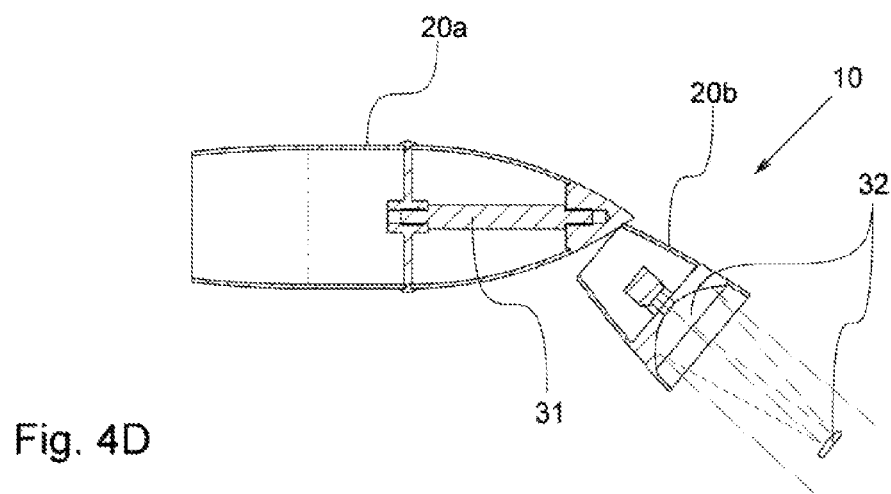
Fig. 4D

MULTIFUNCTION AERODYNAMIC HOUSING FOR BALLISTIC LAUNCH OF A PAYLOAD

BENEFIT CLAIMS TO RELATED APPLICATIONS

This application claims benefit of U.S. provisional App. No. 61/769,699 filed Feb. 26, 2013 in the name of Peter D. Poulsen, said provisional application being hereby incorporated by reference as if fully set forth herein.

BACKGROUND

The field of the present invention relates to ballistic launch of a payload. In particular, multifunction aerodynamic housings are disclosed herein for ballistic launching of a payload.

A need exists for launching payloads into space. Examples of such payloads can include: satellites or other space vehicles; equipment, supplies, provisions, or fuel for spacecraft or space stations; projectile or explosive weaponry; or human or animal remains (usually cremated) or material for space burial or other purposes. Currently available launch technology relies almost exclusively on the use of ground-launched powered rockets for the first and all subsequent phases of launch and flight. The use of rockets has a number of disadvantages, which can include relatively high cost, lengthy launch preparations, long turnaround time between successive launches, or sensitivity to weather conditions at the launch site (because the slowest, and therefore most vulnerable, portions of the rocket's flight occur near the ground just after liftoff).

There have been a number of research efforts to develop a gun-launch alternative for launching payloads into space. Potential advantages of gun launching can include relatively lower cost, shorter launch preparations, relatively rapid turnaround between successive launches, or relative insensitivity to weather conditions at the launch site (because the fastest, and therefore least vulnerable, portions of the launched projectile's flight occurs as it exits the barrel of the gun, so that ground-level weather has a lesser effect on the flight).

Previous efforts to develop a gun-launch system for launching payloads into space include the High Altitude Research Program (HARP) in the 1960's and the Super High Altitude Research Program (SHARP) in the late 1980's and early 1990's; both of those were research programs of the United States government. During the course of HARP a 185 lb. rocket body was launched at a muzzle velocity of 2,160 m/s (7,100 ft/s or about Mach 6), reaching an altitude of about 180 kilometers (591,000 ft). A 5 kg projectile was launched at a muzzle velocity of 3,000 m/s (6,700 mph or about Mach 9) during the course of SHARP. Both projects were eventually cancelled.

Strictly ballistic flight following launch (i.e., without further propulsion after leaving the gun barrel) will not achieve a stable orbit. To achieve a stable earth orbit, additional, guided propulsion is required, typically a rocket motor or other on-board propulsion and guidance system incorporated into the projectile. One example is disclosed in the paper of Gilreath et al ("The Feasibility of Launching Small Satellites with a Light Gas Gun"; 12$^{th}$ AIAA/USU Conference on Small Satellites, Paper No. SSC98-III-6; 1998), which is attached as an Appendix and is hereby also incorporated by reference. Typically the on-board propulsion (e.g., a rocket motor) would not fire until after an initial period of strictly ballistic flight after launch from the gun barrel. At an appropriate point in the ballistic flight, the rocket motor can be fired to achieve orbital insertion. In contrast, if only sub-orbital flight is needed or desired, on-board propulsion and guidance of the projectile may not be needed; strictly ballistic flight could be sufficient in some instances. Likewise, if escape velocity is needed or desired without orbital insertion, then on-board propulsion and guidance may not be required if the muzzle velocity of the gun launch is sufficiently large (i.e., if the muzzle velocity exceeds escape velocity by a margin sufficient to allow for aerodynamic drag on the projectile during its flight). If the muzzle velocity is not large enough, on-board propulsion can be employed to achieve escape velocity.

The initial, ballistic portion of the projectile's flight, after being launched from the gun, is substantially determined by elevation and azimuth of the gun barrel, the muzzle velocity, aerodynamic drag on the projectile, and wind conditions. Typically, the projectile follows a generally parabolic, hyperbolic, or elliptical trajectory. Without additional, onboard propulsion, the projectile either reaches an apogee and falls back to earth, or escapes earth's gravitation altogether (if the muzzle velocity, reduced by aerodynamic drag, exceeds escape velocity). If orbital insertion is desired, or if muzzle velocity alone is insufficient to escape earth's gravity, then additional, onboard propulsion typically is required and can be implemented in a variety of ways.

One problem to address in achieving a gun-based space launch is overcoming aerodynamic drag encountered by the launched projectile, particularly at high Mach number in denser portions of the earth's atmosphere. Earlier attempts typically have not employed projectiles shaped to provide maximal reduction of aerodynamic drag. For example, the projectiles disclosed in the Gilreath paper were roughly conical (i.e., tapered in only the forward direction), which is not optimal for reducing aerodynamic drag. Although some rockets have a modest taper at the rear, such tapers are generally truncated to allow a large opening for the rocket exhaust, thereby increasing aerodynamic drag. A projectile tapered in both fore and aft directions nearly to a sharp point (i.e., bi-tapered or streamlined) is expected to result in relatively less aerodynamic drag (e.g., as shown in FIG. 1). Some examples suitable for super- or hyper-sonic flight are disclosed in the NASA Technical Report of Stivers et al ("Studies of optimum body shapes at hypersonic speeds"; NASA Technical Note D-4191; 1967), which is attached as an Appendix and is hereby also incorporated by reference; such examples can include a Sears-Haack profile, a parabolic arc profile, a Miele profile, or a Von Karman profile.

Further, a rocket motor suitable for use for orbital insertion or achieving escape velocity may not necessarily have an aerodynamic profile suitable for sustained super- or hyper-sonic flight, particularly in lower, denser regions of the earth's atmosphere. In systems that include a rocket motor for providing guidance or propulsion during later stages of flight, that rocket motor can introduce undesirable or unacceptable aerodynamic drag.

SUMMARY

A projectile comprises a payload and an aerodynamic outer housing. The outer housing is arranged, in launch and flight configurations, to surround the payload. The outer housing is further arranged, in the launch configuration, to be launched from a barrel of a launching gun or cannon. The outer housing is further arranged, in the flight configuration, to have a bi-tapered shape that is elongated along a fore-and-aft direction and has a longitudinal profile that tapers in both fore and aft directions. The outer housing is arranged to assume an exoatmospheric configuration upon reaching a target distance-from-launch, a target time-from-launch, a target altitude, or a target velocity. In the exoatmospheric configuration, either (i) the outer housing is arranged to release the payload or (ii) the outer housing and payload are arranged in a propulsion configuration. The projectile can include various additional components or adaptations to enable or achieve specific launch objectives.

Objects and advantages pertaining to ballistic launch of payloads may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2A and 2B are schematic perspective and cross sectional views, respectively, of an embodiment of a projectile with an outer aerodynamic housing and a payload.

FIGS. 3A-3D are perspective views of an embodiment of a projectile with an outer aerodynamic housing and a payload during launch, ballistic flight, payload release, and powered flight, respectively.

FIGS. 4A-4D are schematic side, cross sectional, perspective, and cross sectional views, respectively, of an embodiment of a projectile with an outer housing and a payload.

Figure 1:
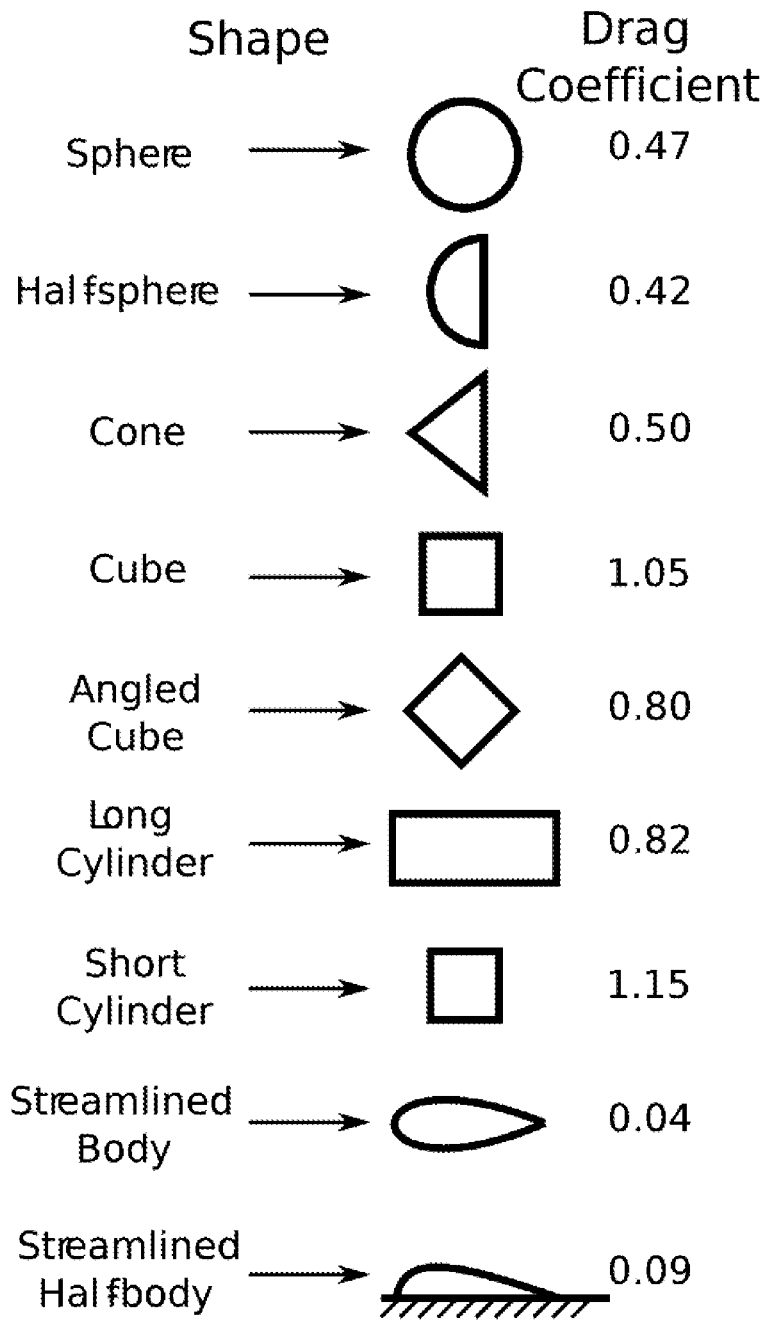
FIG. 1 is a table of aerodynamic drag coefficients for various sample shapes. Wikipedia contributors. Drag coefficient. Wikipedia, The Free Encyclopedia. Jan. 27, 2013, 07:50 UTC. Accessed Feb. 22, 2013. Available at: http://en.wikipedia.org/w/
index.php?title=Drag_coefficient&oldid=535130128.

It should be noted that the embodiments depicted in this disclosure are shown only schematically, and that not all features may be shown in full detail or in proper proportion. Certain features or structures may be exaggerated relative to others for clarity. It should be noted further that the embodiments shown are exemplary only, and should not be construed as limiting the scope of the written description or appended claims.

DETAILED DESCRIPTION OF EMBODIMENTS

It may be desirable to develop a gun-based launch system for launching payloads into space (e.g., into earth orbit, to the moon or into lunar orbit, to the sun or into solar orbit, to a planet or into planetary orbit, or into deep space) that exhibits reduced aerodynamic drag relative to previous systems. It may be desirable to develop such a system that can accommodate retrofitted, repurposed rocket motors into a gun-launched projectile. It may be desirable to provide an aerodynamic housing for a gun-launched projectile that can provide additional functionality after the ballistic portion of the projectile's flight. It may be desirable to employ a pre-existing or repurposed bore hole in the ground as a barrel of a gun-launch system.

FIGS. 2A and 2B illustrate schematically an embodiment of a gun-launched projectile 10 that includes a payload 30 enclosed by an aerodynamic shell or cocoon 20 (i.e., an outer housing 20). The outer housing 20 can comprise any suitably durable, rigid material, and surrounds the payload during launch of the projectile 10 and during at least a first portion of the flight of the projectile 10. Examples of suitable materials can include but are not limited to: organic or inorganic materials comprising an organic resin matrix with embedded fiberglass, graphite, boron, basalt, or other fiber or filament reinforcement; inorganic (ceramic) matrix material with or without embedded fiber or filament; organic or inorganic matrix with embedded nanoparticles or filaments. Some suitable materials can be engineered to disintegrate (intentionally) upon reentry. For example, nitrocellulose can be compounded as a very strong fabrication material. A nitrocellulose housing, provided with a modest oxidation inhibitor and perhaps a modest coating of an ablative material, could readily survive the heat of aerodynamic heating during launch and then completely burn up upon reentering and descending through the atmosphere. In another example, fiber and sheeting forming the housing can be arranged to disassemble during reentry, e.g., by having segments of fiber or sheeting that unravel during reentry heating. In both cases, reentry heating typically is much greater than launch heating, particularly if the housing has been opened and is no longer in its best aerodynamic arrangement. In another example, binding resins can be employed that bind the fibers securely up to a selected temperature above which the resin loses its binding integrity, such as by softening, reflow, or decomposition. The selected temperature preferably would be greater than that resulting from launch heating but less than that resulting from reentry heating.

In a flight configuration, the outer housing 20 can be arranged to have an aerodynamic shape that is elongated along a fore-and-aft direction and has a longitudinal profile that tapers in both forward and aft directions (e.g., as in FIGS. 2A and 2B). This is in contrast to the gun-launched projectile of, e.g., the incorporated paper of Gilreath et al, which is roughly conical in shape. As shown in the table of FIG. 1, a bi-tapered or streamlined body (i.e., a body that tapers in both forward and aft directions) can exhibit an aerodynamic drag coefficient that is over 10× smaller than that of a conical projectile of the same projected frontal area.

The benefits of reduced aerodynamic drag are clear. Upon being fired from the gun, the projectile 10 leaves the barrel with a given amount of kinetic energy. Less drag means less of that kinetic energy is dissipated during the first portions of the flight of the projectile 10 and that the projectile 10 will pass through lower portions of the atmosphere more quickly and will reach a higher altitude. Alternatively, lower muzzle velocity (and hence lower launch acceleration and concomitant stresses on the projectile 10 or the payload) can be employed to achieve a given altitude. Various streamlined body shapes for the outer housing 20 can be employed within the scope of the present disclosure. Some examples suitable for super- or hyper-sonic flight are disclosed in the incorporated NASA Technical Report of Stivers et al, and can include a Sears-Haack profile, a parabolic arc profile, a Miele profile, or a Von Karman profile.

The bi-tapered flight configuration of the outer housing 20 (e.g., as shown in FIGS. 2A and 2B), while well suited for at least an initial, ballistic portion of the flight or projectile 10, may not be an optimal arrangement for launching the projectile 10 from a gun barrel. In some embodiments the outer housing 20 can be arranged in a launch configuration for being launched from the gun barrel, and can be further arranged to transition to the flight configuration upon exiting the barrel. One example of a suitable launch arrangement can include a sabot 22 or push plate 24 or both arranged to engage the outer housing 20 or the inner surface of the gun barrel or both (e.g., as shown in FIG. 3A). The sabot 22 or push plate 24 can serve to align and center the outer housing 20 in the barrel and can act to transfer to the projectile 10 thrust imparted by gases expanding in the gun barrel when it is fired. The sabot 22 or push plate 24 typically are arranged to separate from the outer housing 20 (e.g., as in FIG. 3B) upon the projectile 10 exiting the end of the gun barrel, so that the outer housing 20 assumes its flight configuration (e.g., as in FIGS. 2A and 3B). Any suitable type, material(s), or arrangement of the sabot 22 or the push plate 24 can be employed.

In some embodiments the sabot 22 or push plate 24 can be arranged to engage the aft-tapered portion of a bi-tapered outer housing 20. However, the aft-tapered portion of the outer housing 20 may not be ideal for launching the projectile 10. In some other embodiments, the aft portion of the outer housing 20 can be made collapsible. In a launch arrangement of the outer housing 20, the aft collapsible portion can be collapsed to provide better engagement with sabot 22 or push plate 24, or to better withstand the forces applied by firing the projectile from the gun (e.g., the force of expanding gases propelling the projectile through the barrel). Upon exiting the barrel, the aft collapsible portion can expand to assume its aft-tapered flight configuration. Any suitable mechanical arrangement can be employed to provide a collapsible aft portion. In one example, telescoping segments of the outer housing 20 make up the collapsible aft portion. In another example, the collapsible aft portion of the outer housing 20 can comprise deformable material or materials. In some instances, decreased ambient atmospheric pressure experience by the projectile as it flies into upper, less dense portions of the atmosphere can contribute to achieving or maintaining the collapsible aft portion of the outer housing 20 in its expanded, aft-tapered flight configuration.

in some embodiments, the sabot 22 or push plate 24 can be arranged to engage the outer housing 20 at a forward portion thereof, so that thrust applied by the sabot 22 or push plate 24 is exerted on the outer housing 20 forward of the center of mass of the projectile 10. Such an arrangement can be employed whether or not the aft portion of the outer housing is collapsible or not.

It may be desirable, to enable stable flight of the projectile, to arrange the outer housing 20 and the payload in the flight configuration, so that a center of pressure during flight of the projectile 10 is located aft of a center of mass of the projectile 10. This can be achieved in various ways. In some examples, the payload 30 or the outer housing 20 can have a mass distribution that is skewed toward the forward end of the projectile, e.g., by arranging the outer housing 20 to have thicker walls at its forward end, or by arranging the payload 30 to be more densely arranged at its forward portions, or packing the payload 30 into only a forward portion of the outer housing 20 (leaving an aft portion empty or filled with only low density packing or filler material). In some examples, the outer housing 20 can include one or more fins or other aerodynamic-drag-inducing mechanical projections (not shown); such fins or projections can function in the usual way to stabilize the flight of the projectile 10. The desirability of such fins or projections typically should be weighed against the additional aerodynamic drag they would produce. If fins are used during the high air density portion of the launch, they can be dropped away immediately upon entering low density air.

Any suitable type of gun can be employed for launching the projectile 10 that provides a sufficiently large muzzle velocity. "Sufficiently large" of course depends on the goal of the launch, and whether additional propulsion is available after the projectile's initial, ballistic flight phase. Examples of potentially suitable guns include a conventional (albeit large) cannon employing explosive charges (e.g., such as was developed and tested in HARP), a multi-propulsion-chamber gun (e.g., such as the German V-3 "supergun" developed during WWII), or a light gas gun (e.g., such as was developed and tested in SHARP). Such guns employed for launching the projectile 10 clearly are quite large and expensive to construct.

Figure 6:
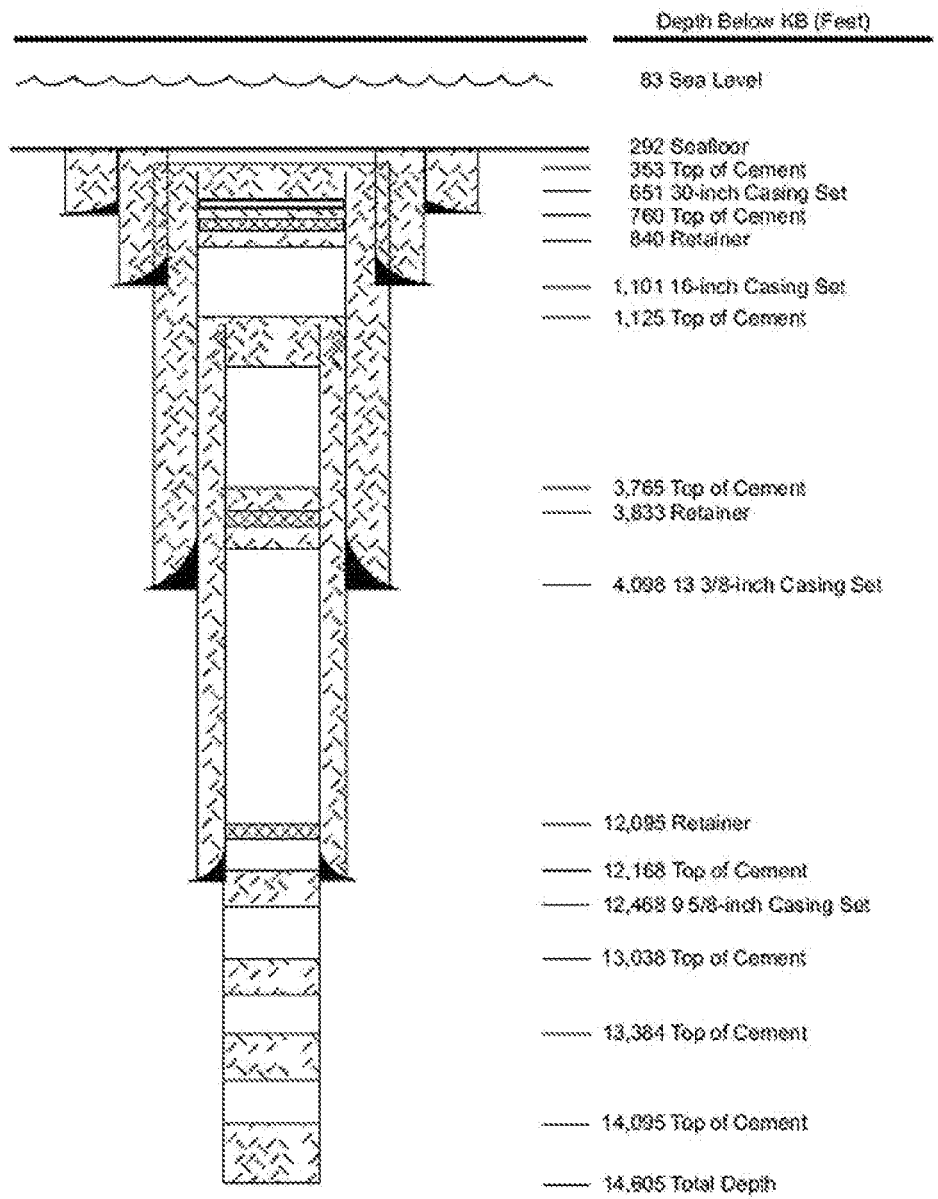
FIG. 6 is a schematic cross sectional view of a typical oil or gas well.

A bore hole dug into the ground can be advantageously employed to contain and support the barrel of the launch gun. A bore hole can be drilled specifically for housing the gun barrel, or an existing bore hole of a water, oil, or gas well can be repurposed for housing the gun barrel, considerably reducing cost. Many such wells typically are lined with a metal casing, which can be adapted to serve as the gun barrel itself. FIG. 6 shows a typical casing arrangement used in an oil well. The depth of a well or bore hole can enable launching of a projectile at a given muzzle velocity at a considerably reduced acceleration. For a given muzzle velocity, the barrel length and acceleration are inversely proportional (in the approximation of uniform acceleration along the barrel). For example, a muzzle velocity of 8500 ft/sec requires over 11,000 g-force over a barrel 100 feet long (which is quite long for a free-standing gun barrel), whereas only about 1100 g-force is needed over a barrel 1000 feet long. Many wells are drilled to much greater depths than that. The significant reduction of g-force on the payload during launch has obvious advantages, including reduced likelihood of damage during launch and reduced need for packing or ruggedizing the payload. If a dedicated bore hole is drilled for launching projectiles, it need only be drilled to the depth desired for launch. If desired, after launch operations are no longer carried out at that site, the bore hole can be extended to greater depths (e.g., to the water table or oil table depth) to establish a water, oil, or gas well at that location.

Well operations commonly use shaped-charge guns to perforate the well casing so that oil can enter the casing to be conveyed to the surface. Typically, these transverse perforations are positioned below the top of the oil table. A well can be sealed (permanently or temporarily) at a level above those perforations and the upper portion of the well bore used as the gun barrel. Other transverse perforations can be formed in the gun-barrel portion of the well bore (i.e., the upper portion above the seal) specifically for insertion of secondary-charge propellant cells used in a multi-stage gun. The secondary charges can be fired as the projectile 10 passes by during launch in its aerodynamic housing 20 (and with its sabot 22 or push plate 24, if employed). Timing of the firing of the secondary charges can be made by mechanical interactions between the projectile and a trigger on each cell, or by electronic sensing based on monitoring of the projectile's progress through the bore hole.

Figure 7:
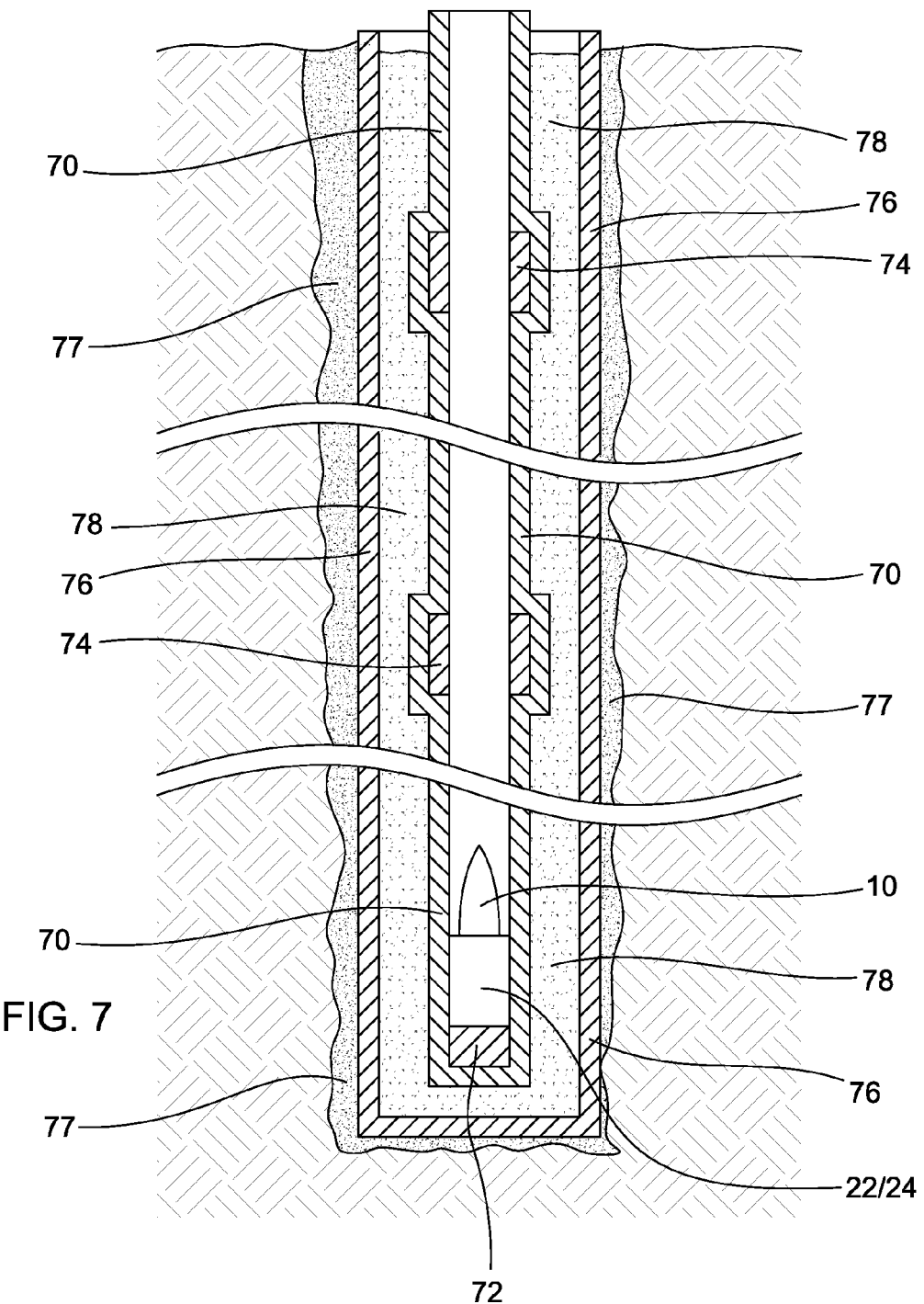
FIG. 7 is a schematic cross sectional view of a removable launch gun positioned within a bore hole.

An example of a launch gun positioned in a bore hole in an earth formation is illustrated schematically in FIG. 7. In that example the gun barrel 70 is constructed and loaded above ground. Loading the gun includes loading a base propellant charge 72 and the projectile 10 into the base of the gun barrel 70, and can also include loading one or more secondary propellant charges 74 into the walls of the gun barrel. The secondary charges 74 can be contained within couplers that link segments of a multi-segment gun barrel 70, or can be attached to the exterior of a unitary gun barrel 70 and positioned to discharge through transverse openings in the wall of the gun barrel 70. Firing of the secondary charges 74 as the projectile 10 moves through the gun barrel 70 can be synchronized in any suitable way (e.g., electronic or mechanical) to maintain sufficient pressure within the gun barrel 70 behind the projectile 10. After loading, the gun barrel 70 can be lowered into a bore hole that is lined with concrete-backed bore hole liner 76 (typically metal, with concrete filler 77 surrounding the liner within the bore hole). Standard drilling mud 78 can be pumped into the bore hole to fill the space between the liner 76 and the gun barrel 70. The arrangement of drilling mud 78, liner, concrete, and surrounding earth formation are standard for oil wells. After firing, the gun barrel 70 can be removed from the bore hole for reloading or for any needed servicing or repair, after which the whole sequence can be repeated as many times as needed or desired.

Whatever the type of gun used and whatever the arrangement of the outer housing 20, the payload 30 it contains must be packed so as to withstand rapid acceleration within the gun barrel to muzzle velocities of several thousand feet/second, e.g., about 5000 ft/sec, 6000 ft/sec, 7000 ft/sec, 7500 ft/sec, 8000 ft/sec, 9000 ft, sec, or 10,000 ft/sec. The projectile can experience acceleration of several thousand, and perhaps over ten thousand, times the acceleration of earth's gravity (i.e., several thousand or ten thousand "g-force"). The outer housing 20 must withstand that acceleration, by being constructed from any sufficiently rigid, durable material, such as those examples listed above. The payload itself is preferably packed or ruggedized to withstand the expected acceleration. A packing arrangement or material of any suitable type, arrangement, or composition can be employed for securing the payload 30 within the outer housing 20, including substantially rigid, resilient, damping, viscoelastic, or shock-absorbing arrangements. Any packing arrangement can also serve to support (from within) the outer housing 20, to enable it to hold its shape during acceleration at launch or during flight.

The ultimate fate of the aerodynamic housing 20 depends on the nature of the payload and its intended use or destination. In some instances the outer housing 20, having protected the payload 30 during launch and ballistic flight, and reduced aerodynamic drag on the projectile 10 during ballistic flight, is no longer needed or might even be a hindrance. In such embodiments the outer housing 20 can be arranged to release the payload 30 and separate from the payload 30 after the projectile 10 reaches a target altitude, a target velocity, a target distance-from-launch, or a target time-from-launch. For example, the outer housing 20 can be arranged to release the payload 30 upon the projectile 10 reaching an altitude of, e.g., 50 km or 100 km. In another example, the outer housing 20 can be arranged to release the payload 30 upon the projectile reaching a downrange distance of, e.g., 30 km or 60 km. In another example, the outer housing can be arranged to release the payload 30 after the velocity of the projectile 10 drops below, e.g., 300 ft/sec or 500 ft/sec. In another example, the outer housing 20 can be arranged to release the payload 30 after, e.g., 20 sec or 30 sec of ballistic flight. In any of those examples, the projectile includes the necessary components (e.g., chronometer or timer, altimeter, airspeed probe, GPS receiver, computer processor, or other components) to detect the desired target condition for releasing the payload 30 form the outer housing 20.

Release of a payload 30 from the outer housing 20 is illustrated schematically in FIGS. 3C and 3D, which depict the outer housing 20 opening and fragmenting and then falling away from the payload 30. Note that the ballistic phase of the projectile's flight can carry it high enough into the atmosphere (e.g., 25 km, 50 km, or 100 km) so that aerodynamic drag is substantially reduced to eliminated. Once that portion of the projectile's flight is reached, the bi-tapered arrangement of the outer housing 20 is no longer provides such a significant reduction in aerodynamic drag. In many instances the outer housing can be simply jettisoned once the projectile reaches such low-density regions of the atmosphere. Any suitable mechanism can be employed for opening or fragmenting the outer housing 20, e.g., releasing mechanical latches that hold together the housing, or firing explosive charges to open or fragment the housing. In some embodiments, gravity or aerodynamic drag can be relied upon to separate the opened or fragmented outer housing 20 from the released payload 30. In some embodiments, explosive charges can be fired to propel the payload 30 away from the housing 20 or vice versa. If charges are employed to open or fragment the housing, those same charges can be arranged also to propel the opened or fragmented outer housing 20 away from the released payload 30. Shaped charges might be particularly suitable for that purpose. Any suitable type of explosive charge can be employed for opening or fragmenting the outer housing 20 or for propelling apart the outer housing 20 and the released payload 30.

Launching human or animal remains, typically cremated, for space burial can be readily and economically accomplished (relative to a standard rocket launch) using a gun-launched projectile 10 with an outer housing 20. The cremated remains, i.e., ashes, can be incorporated into the projectile 10 in a variety of ways; the projectile 10 is then launched from the gun. If escape from earth orbit is desired, then sufficiently large muzzle velocity must be achieved or additional propulsion must be employed; additional propulsion is needed if insertion into earth orbit is desired. If reentry into the earth's atmosphere is desired or acceptable (usually to burn up), then neither escape velocity nor additional propulsion is required, although either or both could still be employed.

In some embodiments, the payload 30 comprises the ashes. If additional propulsion is employed, explosive charges or an onboard motor can be included to alter the course for orbital insertion or to increase velocity to escape earth's gravity. To make space burial still more economical, the ashes can be incorporated into a projectile 10 that has a different primary purpose, i.e., a different, unrelated payload. The ashes are packed into the outer housing 20 as part of the payload 30, which can also include other hardware, supplies, provisions, equipment, satellite, rocket motor, and so on to be transported to space. The ashes can even be employed as packing material for other parts of the payload 30. Upon reaching a target altitude, time, velocity, or position, the payload 30 (including the ashes) is released from the outer housing 20, e.g., as described above. The hardware, supplies, or other art of the payload can be directed to its intended destination. The ashes can be left to drift in space, to orbit the earth, or to fall back to earth, or they can be propelled into orbit or to escape earth's gravity, e.g., using a rocket or explosive charges (shaped, if needed or desired).

In other embodiments of a space burial system, the ashes can be incorporated into the material of the outer housing 20, e.g., as mineral or inorganic filler for a composite material, and that outer housing can be employed to launch an unrelated payload 30 (e.g., equipment, supplied, provisions, a satellite, and so on). Upon releasing the payload, the opened or fragmented outer housing 20 (including the incorporated ashes) can be left to drift in space, to orbit the earth, or to fall back to earth, or it can be propelled into orbit or to escape earth's gravity, e.g., using a dedicated rocket or explosive charges (shaped, if needed or desired).

Another, different payload might comprise DNA samples from one or more subjects (living or dead; human, animal, or even plant). Such samples might include, for example, a cheek swab or a hair sample. The DNA samples can be loaded into a housing 20 and launched into or beyond the upper atmosphere, where they can be released to disperse or propelled deeper into space, e.g., by a rocket motor or shaped charge. If the muzzle velocity exceeds escape velocity (accounting for aerodynamic drag on the way up through the atmosphere), additional propulsion might not be needed to reach deep space.

The launching of such a DNA sample can be undertaken to give the subject (or the subject's family) a sense of the subject's "immortality" due to the ongoing presence in space of the subject's DNA (which is a biological part of the subject), and represents a significant commercial opportunity. As with space burial, the relatively low expense of gun launch versus more conventional rocket launch may make such a service economically feasible. On a more practical level, while digital representations of DNA sequences exist (and could be launched in a projectile), such representations do not typically include sufficient information to recreate the subject's entire genome, and would be insufficient for use in future technologies that might enable "rebirth" of the subject (e.g., through cloning or other as yet undeveloped methods). Launching a complete DNA sample obtained directly from the subject into space provides a long-term repository for the subject's complete genome.

For the purpose of dispersal over a larger region of near-Earth space or launch into deep space, the DNA sample cells are dispersed and captured as core material for micro-encapsulation, typically at freezing or sub-freezing temperatures. Such microencapsulation can preserve the DNA sample in a space environment. Any of several existing techniques for microencapsulation can be employed. The so-called air-floating technique might be advantageously employed because it allows the sample containing the DNA to remain frozen. In the air-floating process the DNA-containing material is dispersed in a supporting air stream. The suspended particles are coated by condensation of evaporated material, or by evaporation of a volatile solvent that leaves behind a thin layer of dissolved polymer coating. The coating process can be repeated as needed to build up the desired coating thickness. The microcapsules (however they are formed) then can be coated with reflective material (such as silver, aluminum, gold) to prevent melting from earthshine, launch or propellant heat, or solar radiation. Microencapsulation can enable survival of the DNA during the mechanical and heating stresses as the shaped charge projectile is formed upon detonation to propel the payload. In one example, an ensemble of frozen microcapsules can be assembled in a sintered form to make the shaped-charge liner, or can be coated onto the exterior of such a liner made of typical material used for the purpose, such as copper, molybdenum, and aluminum. In another example, DNA samples can be integrated into a fullerene matrix, which can also provide an additional molecular level "backbone" to the long DNA molecules. In another example, dehydration and cryofixation of the chromosomal DNA followed by infusion with helium, with subsequent pressurization and cooling to the helium liquidation point, can provide a structure that holds the DNA structure in place during the shock of launch and of shaped-projectile formation. Over time after those events, the helium can return to its gaseous state and diffuse away, leaving the DNA in its original form.

The payload 30 in some embodiments can include a rocket motor or other propulsion system, e.g., a rocket motor. A rocket motor can be employed to execute a course correction to convert the ballistic trajectory of the projectile to an orbital trajectory or an escape trajectory, as needed or desired. Any suitable rocket motor can be employed, including legacy rocket motors recovered from retired military munitions. For example, there exists an extensive stockpile of rocket motors recovered from retired Phoenix, Sidewinder, Hellfire, or other missiles. Such motors, singly or in clusters, can be readily retrofitted into an outer housing 20 for firing from a gun. Upon release from the outer housing (as described above), the rocket motor can be fired to propel the payload 30 along a desired trajectory. Many such legacy missile rocket motors were intended for use at speeds from about Mach 2 to Mach 5, and are not necessarily suitable for flight at higher Mach numbers (e.g., Mach 8-12). Use of a bi-tapered aerodynamic outer housing 20 enables use of such repurposed rocket motors in a gun launch system, even with muzzle velocities in the Mach 8-12 range. New, specifically designed rocket motors can be employed as well, if needed or desired.

A common use of the gun-launched projectile 10 with a rocket is expected to be quick-response launching of satellites of any type or purpose, in response to urgent military, weather, scientific, or other needs. As noted above, a gun-launched payload can be readied for launch relatively more quickly than a rocket-launched payload (e.g., in days or a few weeks versus months). The gun launch is also significantly less sensitive to weather conditions at the launch site, which also enables more rapid launch in response to an urgent need. The outer housing 20 is well suited for enclosing and protecting the satellite and rocket motor for launch and ballistic flight, and for reducing aerodynamic drag on the projectile during its flight in the lower, denser portions of the earth's atmosphere. Once the projectile has reached upper, less dense portions of the atmosphere, the rocket motor can provide additional propulsion and guidance to insert the satellite into the desired orbit, and perhaps to maneuver between different desired orbits over time.

Instead of simply jettisoning the outer housing 20 after the ballistic, atmospheric phase of the projectile's flight, in some embodiments the outer housing 20, or at least portions thereof, remains attached to the projectile and can serve other purposes once the need to reduce aerodynamic drag is reduced or absent (in upper, less dense regions of the earth's atmosphere). In one example, a portion of the outer housing 20 can act as a fuel tank or reservoir, storing liquid propellant for an onboard rocket motor. When a portion of the outer housing 20 serves as a fuel source, the outer housing can remain in its bi-tapered arrangement (assuming an outlet for the rocket motor extends the length of the outer housing 20 to discharge at the housing's rear end). That arrangement is shown, e.g., in the cross section of FIG. 2B. However, it may be desirable for the outer housing to assume a "propulsion configuration" in which a segment of the outer housing 20 is shifted away from its location or orientation in the flight configuration (i.e., away from the bi-tapered arrangement). In one such example, an aft tapered portion of the outer housing 20 that acts as a fuel reservoir can be shifted to the front end of the outer housing, so as to leave unobstructed the exhaust of the rocket motor mounted within a forward portion of the outer housing 20.

Instead of or in addition to a liquid fuel reservoir, the outer housing 20 can in some embodiments house a battery, fuel cell, or other source of electric power. That source can be employed for powering, e.g., onboard guidance components, a satellite payload, or other electrically powered components within the projectile or within the payload. Just as with the fuel reservoir, with an electrical power source in a portion of the outer housing, that portion of the housing can remain in its position in the flight configuration, or can move to a different position or orientation in a propulsion configuration of the projectile.

In other embodiments, a portion of the outer housing 20 can act as a mounting platform for some or all of the component of the payload 30. In other words, the outer housing 20, upon reaching a exoatmospheric portion of the flight, can serve as a portion of a gun-launched satellite. For example, in the embodiment of FIGS. 4A-4D, the projectile 10 comprises the outer housing 20 (which later divides into a front portion 20a and a rear portion 20b) and a payload comprising a rocket motor 31 and imaging components 32 (for any suitable or desired portion of the electromagnetic spectrum). In the bi-tapered flight configuration (FIGS. 4A and 4B), the rocket motor 31 is mounted within a forward portion of the outer housing 20 and the imaging components 32 are mounted within a rearward portion of the outer housing 20. After the gun launch and the ballistic portion of the flight, and upon reaching upper, less dense portions of the atmosphere and moving at relatively slower speeds, the outer housing is arranged to split into forward and rear portions 20a and 20b, respectively. Any suitable mechanism can be provided to enable the rearward housing 20b, with the imaging component 32 mounted therein, to move around to the front end of the forward housing 20a. The projectile 10 thereby assumes its propulsion configuration and functions as an imaging satellite, with the rocket motor 31 providing propulsion or guidance and the imaging component 32 providing the imaging functionality.

In other, similar embodiments, the rearward portion of the outer housing can contain any suitable or desired equipment or components that might be desirable to place into orbit. Examples can include but are not limited to: imaging, detection, receiving, or transmitting components or equipment for any desired portions of the electromagnetic spectrum; weaponry; liquid or solid propellant storage; other equipment or instrumentation, or storage for other objects or material.

Figure 5A:
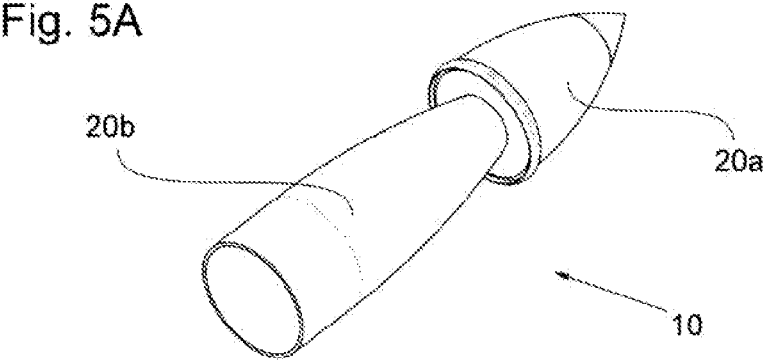
FIGS. 5A-5C are schematic perspective views of a projectile with an outer housing and a payload in differing arrangements.
Figure 5B:
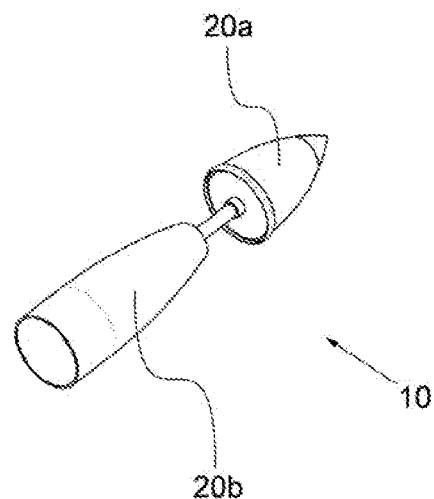
Figure 5C:
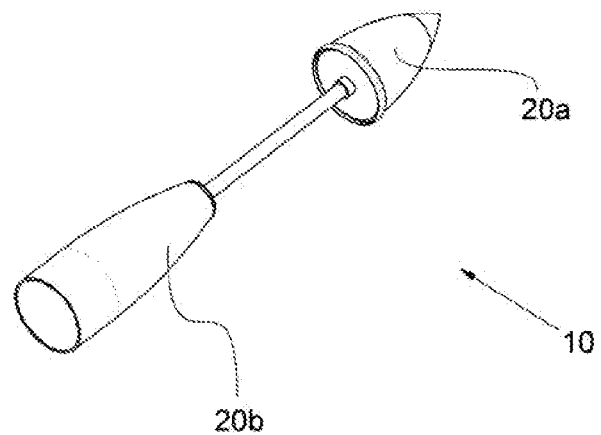

In some embodiments a rear portion of the outer housing can act as the rocket motor or at least a portion thereof. In FIGS. 5A-5C, the rear portion 20b of the outer housing 20 is shown rotated 180° from its flight arrangement to instead form a flared "tail cone" for propulsion. The tail cone 20b can be positioned at varying distances from the front portion 20a of the outer housing, as needed or desired. In one example, the rearward portion 20b (i.e., the tail cone 20b in this arrangement) of the outer housing can be at least partly filled with solid propellant, and thus can act as the onboard propulsion source for the projectile. In an extreme example of this, the solid propellant can be arranged as a shaped charge to generate very high projectile velocities, e.g., for achieving an escape trajectory, for conducting high-impact studies, or for use as a kinetic projectile weapon. On another example, the tail cone 20b can serve to direct exhaust gases ejected by a rocket motor mounted in the forward portion 20a of the outer housing, thereby acting to provide propulsion and guidance.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A projectile comprising a payload and an aerodynamic outer housing, wherein:
   (a) the outer housing is arranged, in launch and flight configurations, to surround the payload;
   (b) the outer housing is further arranged, in the launch configuration, to be launched from a barrel of a launching gun or cannon;

(c) the outer housing is further arranged, in the flight configuration, to have a bi-tapered shape that is elongated along a fore-and-aft direction and has a longitudinal profile that tapers in both fore and aft directions;

(d) the outer housing is arranged to assume an exoatmospheric configuration upon reaching a target distance-from-launch, a target time-from-launch, a target altitude, or a target velocity;

(e) in the exoatmospheric configuration, either (i) the outer housing is arranged to release the payload or (ii) the outer housing and payload are arranged in a propulsion configuration;

the outer housing is arranged to transition from the launch configuration to the flight configuration upon the projectile exiting the barrel; and an aft portion of the outer housing is collapsible, the aft portion of the housing is collapsed in the launch configuration, and the aft portion of the housing is extended in the flight configuration.

2. A projectile comprising a payload and an aerodynamic outer housing, wherein:

(a) the outer housing is arranged, in launch and flight configurations, to surround the payload;

(b) the outer housing is further arranged, in the launch configuration, to be launched from a barrel of a launching gun or cannon;

(c) the outer housing is further arranged, in the flight configuration, to have a bi-tapered shape that is elongated along a fore-and-aft direction and has a longitudinal profile that tapers in both fore and aft directions;

(d) the outer housing is arranged to assume an exoatmospheric configuration upon reaching a target distance-from-launch, a target time-from-launch, a target altitude, or a target velocity;

(e) in the exoatmospheric configuration, either (i) the outer housing is arranged to release the payload or (ii) the outer housing and payload are arranged in a propulsion configuration;

in the exoatmospheric configuration, the outer housing and payload are arranged in the propulsion configuration; and in the propulsion configuration, an aft portion of the outer housing that is rearward-tapered in the flight configuration is arranged antiparallel to that arrangement and so is forward-tapered.

3. The projectile of claim 2 wherein the forward-tapered rearward portion of the outer housing acts as at least a portion of a rocket motor.

4. A projectile comprising a payload and an aerodynamic outer housing, wherein:

(a) the outer housing is arranged, in launch and flight configurations, to surround the payload;

(b) the outer housing is further arranged, in the launch configuration, to be launched from a barrel of a launching gun or cannon;

(c) the outer housing is further arranged, in the flight configuration, to have a bi-tapered shape that is elongated along a fore-and-aft direction and has a longitudinal profile that tapers in both fore and aft directions;

(d) the outer housing is arranged to assume an exoatmospheric configuration upon reaching a target distance-from-launch, a target time-from-launch, a target altitude, or a target velocity;

(e) in the exoatmospheric configuration, either (i) the outer housing is arranged to release the payload or (ii) the outer housing and payload are arranged in a propulsion configuration;

in the exoatmospheric configuration, the outer housing and payload are arranged in the propulsion configuration; and in the propulsion configuration, an aft portion of the outer housing that is rearward-tapered in the flight configuration is positioned at a forward end of the projectile.

5. The projectile of claim 4 wherein forward-positioned aft portion of the outer housing contains fuel or propellant, imaging components, instrumentation, equipment, or stored objects or material.

6. A method comprising:

(a) loading a projectile into a barrel of a launching gun or cannon;

(b) after loading the projectile and before launching the projectile, lowering the gun barrel into a casing-lined bore hole and filling at least a portion of a volume of the bore hole outside the gun barrel with drilling mud; and (c) launching the projectile from the barrel of the launching gun or cannon, wherein:

(d) the projectile comprises a payload and an aerodynamic outer housing;

(e) the outer housing is arranged, in launch and flight configurations, to surround the payload;

(f) the outer housing is further arranged, in the launch configuration, to be launched from a barrel of a launching gun or cannon;

(g) the outer housing is further arranged, in the flight configuration, to have a bi-tapered shape that is elongated along a fore-and-aft direction and has a longitudinal profile that tapers in both fore and aft directions;

(h) the outer housing is arranged to assume an exoatmospheric configuration upon reaching a target distance-from-launch, a target time-from-launch, a target altitude, or a target velocity; and (i) in the exoatmospheric configuration, either (i) the outer housing is arranged to release the payload or (ii) the outer housing and payload are arranged in a propulsion configuration.

7. The method of claim 6 further comprising, after launching the projectile, removing the barrel from the casing-lined bore hole.

* * * * *